(12) United States Patent
Vinssac et al.

(10) Patent No.: US 9,315,169 B2
(45) Date of Patent: Apr. 19, 2016

(54) AIRBAG WITH ATTACHMENT MEANS

(71) Applicants: Stefan Vinssac, Düsseldorf (DE); Dirk Hochstein-Lenzen, Zwingenberg (DE)

(72) Inventors: Stefan Vinssac, Düsseldorf (DE); Dirk Hochstein-Lenzen, Zwingenberg (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 14/529,867

(22) Filed: Oct. 31, 2014

(65) Prior Publication Data

US 2015/0130168 A1 May 14, 2015

(30) Foreign Application Priority Data

Nov. 8, 2013 (DE) .......................... 10 2013 018 824

(51) Int. Cl.
*B60R 21/213* (2011.01)
*B60R 21/217* (2011.01)

(52) U.S. Cl.
CPC ............. *B60R 21/213* (2013.01); *B60R 21/217* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 4,762,310 | A | * | 8/1988 | Krajewski | B60G 7/02 267/141.2 |
| 5,190,423 | A | * | 3/1993 | Ewing | F16B 39/282 411/134 |
| 5,203,656 | A | * | 4/1993 | McKinlay | F16B 39/282 411/149 |
| 6,851,702 | B2 | * | 2/2005 | Henderson | B60R 21/213 280/728.2 |
| 7,290,795 | B2 | * | 11/2007 | Kawai | B60R 21/215 24/297 |
| 7,547,038 | B2 | * | 6/2009 | Coleman | B60R 21/213 248/200 |
| 8,899,895 | B2 | * | 12/2014 | McKinlay | F16B 39/24 411/147 |
| 2003/0222435 | A1 | * | 12/2003 | Schmidt | B60R 21/213 280/728.2 |
| 2004/0201198 | A1 | * | 10/2004 | Buckhouse | B62K 21/02 280/276 |
| 2006/0197317 | A1 | * | 9/2006 | Watanabe | B60R 21/213 280/728.2 |
| 2007/0024031 | A1 | | 2/2007 | Coleman | |
| 2008/0236830 | A1 | * | 10/2008 | Fuhst | E21B 29/005 166/298 |
| 2010/0040430 | A1 | * | 2/2010 | McKinlay | F16B 39/24 411/134 |
| 2012/0039687 | A1 | * | 2/2012 | Ostergren | F16B 21/02 411/508 |
| 2013/0011215 | A1 | * | 1/2013 | Wells | F16B 23/0007 411/402 |
| 2013/0069345 | A1 | * | 3/2013 | Williams | B60R 21/20 280/728.2 |
| 2013/0094922 | A1 | * | 4/2013 | Bisset | F16B 31/102 411/276 |
| 2013/0249194 | A1 | * | 9/2013 | Hashizume | B60R 21/20 280/728.2 |
| 2013/0266396 | A1 | * | 10/2013 | Dionne | F16B 39/26 411/313 |

FOREIGN PATENT DOCUMENTS

DE 202011108508 U1 4/2012
DE 202011108508 U1 * 4/2012

* cited by examiner

*Primary Examiner* — Paul N Dickson
*Assistant Examiner* — Darlene P Condra
(74) *Attorney, Agent, or Firm* — Markell Seitzman

(57) ABSTRACT

An airbag for a vehicle has an attachment pocket with a through-opening, which extends through the layers of the attachment pocket, a first flat attachment means with a through-hole, wherein the first attachment means is arranged in the attachment pocket so that the through-hole is exposed on both sides of the attachment pocket through the opening, a second attachment means with a threaded area, a coupling area, and a head area, a spacing means, which is formed on the first attachment means and/or on the second attachment means, wherein the threaded area is designed to be connected to a corresponding vehicle-side threaded means.

13 Claims, 8 Drawing Sheets

(a)

(b)

AIRBAG WITH ATTACHMENT MEANS

TECHNICAL FIELD

The present invention relates to an airbag with an attachment means.

BACKGROUND OF THE INVENTION

Airbags are used in vehicles for passenger protection in the case of accidents, wherein, in the case of a vehicle impact, the inflatable cushion of the airbag is filled with a gas in order to cushion parts of the passenger's body and prevent injuries to the passenger.

Airbags are attached by means of attachment means to the vehicle structure, wherein the attachment means can be provided in or on a flap on the marginal area of the airbag.

DE 20 2011 108 508 U1 discloses an airbag, wherein, on the marginal area of the airbag, a pocket is formed with mutually facing openings in the two lateral pocket layers, wherein, in the pocket, an attachment means in the form of a spring washer with a central opening is arranged in such a manner that the opening of the spring washer is aligned with the openings of the pocket. In order to attach the airbag to the vehicle structure, the spring washer is slipped onto a bolt attached to the vehicle structure, so that the bolt extends through the openings of the pocket and of the spring washer, and the spring washer is held by a clamping connection on the bolt.

However, in the case of the above-described airbag, the problem was that the holding force of the clamping washer was not able to easily engage with the vehicle-side bolt. In part, the holding force was also not sufficient. Moreover, it was possible that, at the time of the attachment of the airbag to the vehicle structure, a portion of the pocket could became jammed between the clamping washer and the vehicle structure, which could prevent the free deployment of the airbag during the inflation.

Therefore, the problem of the present invention is to provide an airbag which can be attached in a simple and reliable manner to the vehicle structure and which ensures a free deployment of the airbag at the time of the inflation.

This problem is solved by the subject matter of the independent claim 1. Preferred embodiments result from the dependent claims.

SUMMARY OF THE INVENTION

According to the present invention, an airbag for a vehicle is provided, comprising an attachment pocket with a through-opening which extends through the layers of the attachment pocket, a first flat attachment means with a through-hole, wherein the first attachment means is arranged in the attachment pocket so that the through-hole is exposed on both sides of the attachment pocket through the opening, a second attachment means with a threaded area, with a coupling area, and with a head area, a spacing means which is formed on the first attachment means and/or on the second attachment means, wherein the threaded area is designed to be connected with a corresponding vehicle-side threaded means, the second attachment means can be introduced into the through-hole of the first attachment means, so that the coupling area is in contact with the inner surface of the through-hole, the head area has a larger diameter than the through-hole and comprises a drive profile, and the spacing means is configured to prevent jamming of a portion of the attachment pocket by the first attachment means at the time of the attachment of the airbag to the vehicle.

The attachment pocket can be formed on a flap on a marginal area, in particular on an upper marginal area of the airbag, wherein the flap can be designed so it adjoins the inflatable portion of the airbag, the airbag cushion. The flap itself is not inflatable. The airbag comprising the flap can be produced from a flat material, for example, a textile material. The attachment pocket can be formed, for example, by folding the flap parallel or perpendicularly to the edge of the airbag cushion and by sewing, adhesively bonding and/or welding. Alternatively, the attachment pocket can also be woven, for example, in a 3D weaving process ("one piece woven"). The attachment pocket can comprise, for example, two pocket layers, which form the attachment pocket at least partially. The through-opening of the pocket is designed in such a manner that mutually facing openings are formed in the two pocket layers. The through-opening of the attachment pocket can be formed in the shape of a circle, wherein the diameter of the opening is at least as large as the diameter of the through-hole of the first attachment means and, on the other hand, sufficiently small to prevent the first attachment means from coming out of the opening.

The through-hole of the first attachment means can also be formed in the shape of a circle and it is aligned with the through-opening of the attachment pocket. For the positioning of the first attachment means in the attachment pocket, a reception contour can be provided in the attachment pocket, which corresponds to the outer contour of the first attachment means. The reception contour can be formed by sewing or adhesive bonding of areas of the attachment pocket, wherein an area can be provided for the introduction of the first attachment means into the attachment pocket. The first attachment means can be designed in the shape of a washer, and, in particular, it can be in the shape of a circle. In this case, the reception contour can have the shape of a keyhole, so that the first attachment means can be introduced laterally into the attachment pocket and it snaps into the receiver. Due to the circular shape of the first attachment means, it is possible to ensure that the first attachment means remains freely rotatable in the pocket. The first attachment means can also be formed as a rigid, solid washer, or also as a spring washer, of the Belleville type, for example.

However, since, according to the invention, only the free rotatability of the airbag relative to the vehicle structure or vehicle frame has to be ensured, this can be achieved instead or additionally by a free rotatability of the first attachment means relative to the second attachment means. In the case where the free rotatability of the airbag relative to the vehicle frame is achieved exclusively by the free rotatability of the first attachment means relative to the second attachment means, the first attachment means and the reception contour can also have a noncircular shape, for example, a rectangular, in particular a quadrangular, pentagonal, hexagonal or polygonal shape, or an oval or elliptical shape.

The second attachment means is stuck through the through-hole of the first attachment means. Here, between the coupling area of the second attachment means and the through-hole of the first attachment means, there can be a press fit or tight fit, or a loose fit. The fit is preferably selected in such a manner that the first and second attachment means are prevented from coming apart, but a relative twisting of the first attachment means relative to the second attachment means remains possible. The coupling area can be formed substantially in the shape of a cylinder.

The head area of the second attachment means is used to prevent the first attachment means from coming off the second attachment means, and to make it possible to drive, in particular to rotate, the second attachment means, in order to connect and tighten the threaded area of the second attachment means with the vehicle-side threaded means. For this purpose, the head area has a drive profile, wherein the drive profile can be formed as an external hex, an internal hex, a straight groove, cruciform groove or any other known drive profile, which can be tightened by means of a tool and/or also by hand.

The spacing means is configured in order to prevent a jamming of a portion of the attachment pocket by the first attachment means at the time of the attachment of the airbag to the vehicle frame or vehicle structure. In particular, it is possible to prevent the area around the through-opening of the attachment pocket from becoming jammed in between the first attachment means and the vehicle frame and/or between the first attachment means and the head area of the second attachment means.

Advantageously, by way of the configuration of the airbag in accordance with the present invention, the airbag can be connected by a screw connection to the vehicle frame or structure. In particular, the second attachment means can be screwed to the vehicle-side threaded with a verifiable torque. This makes it possible to meet safety standards. Furthermore, a reliable attachment is made possible, which prevents the airbag from coming out of the vehicle frame. The fit between the coupling area of the second attachment means and the through-hole of the first attachment means in addition allows simple handling, since the first and second attachment means can already be preassembled in the attachment pocket, so that the airbag can be attached on the vehicle frame with a single movement of the hand. In addition, the drive profile of the second attachment means allows a simple attachment of the airbag to the vehicle frame. An additional essential advantage is that jamming of the airbag is prevented, so that it is possible to ensure that the airbag can deploy or spread out freely as it is inflated.

Advantageously, the spacing means comprises a thickened area formed around the through-hole of the first attachment means and protruding from the opening of the attachment pocket.

The thickened area can be formed in the shape of a step on the surface of the first attachment means, and it can protrude on both sides from the opening of the attachment pocket. The thickened area can also protrude on one side from the opening of the attachment pocket, on the side facing the vehicle frame or on the side facing the head area of the second attachment means. The thickened area can have a substantially circular shape concentric with respect to the through-hole of the first attachment means, wherein the outer diameter of the thickened area can be smaller than or equal to the diameter of the opening of the attachment pocket. In other words, the diameter of the opening of the attachment pocket can be adapted to the outer diameter of the thickened area or vice versa. The height of the thickened area on a side of the first attachment means is greater than the thickness of a pocket layer of the attachment pocket.

Advantageously, it is possible to effectively prevent, by means of the thickened area, a portion of the attachment pocket from becoming jammed between the first attachment means and the vehicle frame or the head area of the second attachment means, since the contact between the first attachment means and the vehicle frame or the head area of the second attachment means occurs at a distance from the attachment pocket. For example, the first attachment means can also be clamped in firmly between the vehicle frame and the head area of the second attachment means, without the attachment pocket also being clamped in. Thus, the rotatability of the attachment pocket and consequently of the airbag cushion relative to the first attachment means is maintained.

Advantageously, the spacing means comprises a spacing section which adjoins the coupling area of the second attachment means and is configured in order to prevent the distance between the head area and a vehicle frame from falling below a predetermined distance when the first attachment means is screwed to the vehicle-side threaded means.

The spacing section can be in the shape of a cylinder. In particular, the coupling area and the spacing section together can form a continuous cylindrical section. However, the coupling section can also have a smaller diameter than the spacing section and be formed as a groove into which the first attachment means snaps. The axial length of the section of the coupling area and the spacing section is greater than the thickness of the first attachment means, preferably plus the two pocket layers of the attachment pocket. The predetermined distance between the head area and the vehicle frame which must be reached when the second attachment means is screwed to the vehicle-side threaded means is at least greater than the thickness of the first attachment means in axial direction, preferably plus the two pocket layers of the attachment pocket. The distance between the stopping point of the first and second attachment means, when the second attachment means is stuck through the first attachment means to the point of stopping, and the stopping point of the first attachment means and of the vehicle frame, when the second attachment means is completely screwed to the vehicle-side threaded means, is also greater than the thickness of the first attachment means, preferably plus the two pocket layers of the attachment pocket. In other words, the length of the cylindrical section of the second attachment means between the head area and the vehicle frame, cylindrical section which has substantially the same diameter as or a smaller diameter than the through-hole of the first attachment means, is greater than the thickness of the first attachment means, preferably plus the two pocket layers of the attachment pocket.

Advantageously, by means of the spacing section, it is possible to prevent a portion of the attachment pocket from becoming jammed between the first attachment means and the vehicle frame or the head area of the second attachment means, since a distance between the first attachment means and the vehicle frame or the head area of the second attachment means is always ensured. In other words, the first attachment means is not clamped in between the vehicle frame and the head area of the second attachment means, so that the attachment pocket can also not be clamped in by the first attachment means, even when the second attachment means is firmly screwed to the vehicle-side threaded means. Moreover, it is advantageous that, as a result, a free rotatability of the first attachment means relative to the second attachment means can be made possible, which further improves the mobility and free deployability of the airbag. Furthermore, it is advantageous that the contact between the second attachment means and the vehicle frame occurs at a distance from the attachment pocket, namely on the vehicle-frame-side end of the spacing section, so that it is also possible to effectively prevent a portion of the attachment pocket from being clamped in between the vehicle frame and the second attachment means.

Advantageously, the spacing means comprises a step section, which is formed between the coupling area and the head area, wherein the step section has a larger diameter than the through-hole of the first attachment means and a smaller diameter than the opening of the attachment pocket.

The step section forms the abutment point of the first and second attachment means, when the second attachment means is stuck through the first attachment means to the point of stopping. Advantageously, the step section has an axial length which is at least greater than the thickness of a pocket layer of the attachment pocket. The step section can be considered to be a portion of the head area of the second attachment means.

Advantageously, by means of the step section, it is prevented that a portion of the attachment pocket becomes clamped in between the first attachment means and the head area of the second attachment means, since the step section ensures a certain distance between the first attachment means and the head area of the second attachment means.

Advantageously, the second attachment means has a tubular portion, wherein the threaded area is formed as inner thread in the tubular portion, which can be connected to the vehicle-side threaded means, in particular in the form of a threaded bolt, and wherein the coupling area is formed by at least one section of the outer lateral surface of the tubular portion.

The tubular portion can comprise the spacing section, and the axial length of the coupling section and of the spacing section together can correspond to the total axial length of the tubular portion. The threaded bore through the tubular portion can extend through the head area.

Advantageously, by way of the above configuration of the second attachment means, a compact component is produced, which allows a simple and reliable attachment of the airbag to the vehicle frame, and which, at the same time, effectively prevents jamming of a portion of the attachment pocket.

Advantageously, the second attachment means comprises a bolt-shaped portion, wherein the threaded area is formed as an outer thread on the bolt-shaped portion which can be connected to the vehicle-side threaded means, in particular in the form of a threaded hole, and wherein the coupling area is formed by at least part of a shank of the bolt-shaped portion between the threaded area and the head area.

The outer thread can adjoin the shank on the bolt-shaped portion of the second attachment means. The shank has no outer thread, so that the shank can also be referred to as threadless section of the bolt-shaped portion. The shank has a diameter which is at least greater than the core diameter of the outer thread. In addition to the coupling area, the shank can comprise the spacing section. The step section can adjoin the shank next to the head area.

Advantageously, by means of the above configuration of the second attachment means, a simple and reliable attachment of the airbag to the vehicle frame is made possible by a simple modification of a conventional bolt screw, and at the same time jamming of a portion of the attachment pocket is effectively prevented.

Advantageously, the first attachment means is rotatably arranged in the attachment pocket.

Rotatably here means that the first attachment means is rotatable relative to the attachment pocket around the longitudinal axis of the through-hole, and vice versa. In particular, this can be achieved by a circular washer shape of the first attachment means and a corresponding free space in the interior of the attachment pocket.

Advantageously, a free, unimpeded deployment of the airbag can be ensured at the time of inflation due to the rotatability of the first attachment means in the attachment pocket.

Advantageously, the through-hole of the first attachment means and the coupling area of the second attachment means are configured so that the second attachment means can be connected in a clamping manner by means of a predeterminable clamping force to the first attachment means, wherein the predeterminable clamping force prevents the first and second attachment means from coming apart.

The clamping connection of the first and second attachment means can be achieved in particular by a press fit. Alternatively or additionally the coupling area can be designed as a groove, into which the first attachment means is clipped or snapped. The clamping force or holding force is adjusted here so that coming apart can be prevented during the usual handling of the airbag at the time of the installation.

Advantageously, the first and second attachment means can thus already be preassembled in the attachment pocket, without the risk of losing the second attachment means. In this way, the installation effort can be reduced, since handling with several components is eliminated.

Preferably, the predeterminable clamping force nevertheless allows a relative twisting between the first and second attachment means.

The predeterminable clamping force can be adjusted in such a manner that the force or the torque exerted on the attachment pocket when the airbag is inflated in the case of an incorrect position of the attachment pocket is sufficient to turn the first attachment means relative to the second attachment means into the correct position.

Advantageously, a free, unimpeded deployment of the airbag at the time of the inflation can thus be ensured even if free rotatability of the first attachment means relative to the attachment pocket is not ensured.

Preferably, the spacing means is configured to prevent jamming of the first attachment means between the second attachment means and a vehicle frame when the second attachment means is screwed to the vehicle-side threaded means.

In other words, the spacing means prevents the first attachment means from becoming clamped in between the second attachment means or the head area, or the step section thereof, and the vehicle frame, when the second attachment means is firmly screwed to the vehicle-side threaded means.

Advantageously, the free rotatability of the first attachment means relative to the second attachment means or relative to the vehicle frame can thereby be ensured, so that the airbag can deploy freely and without impediment even when a free rotatability of the first attachment means relative to the attachment pocket is not ensured.

BRIEF DESCRIPTION OF THE DRAWINGS

Below, embodiment examples of the present invention are described in detail in reference to the figures. However, the present invention is not limited to the embodiments described below. Rather, any embodiments are conceivable, provided that they fall within the scope of the claims. Furthermore, individual features of the individual embodiments are mutually exchangeable or they can be combined with one another.

DETAILED DESCRIPTION OF THE INVENTION

Figure 1:
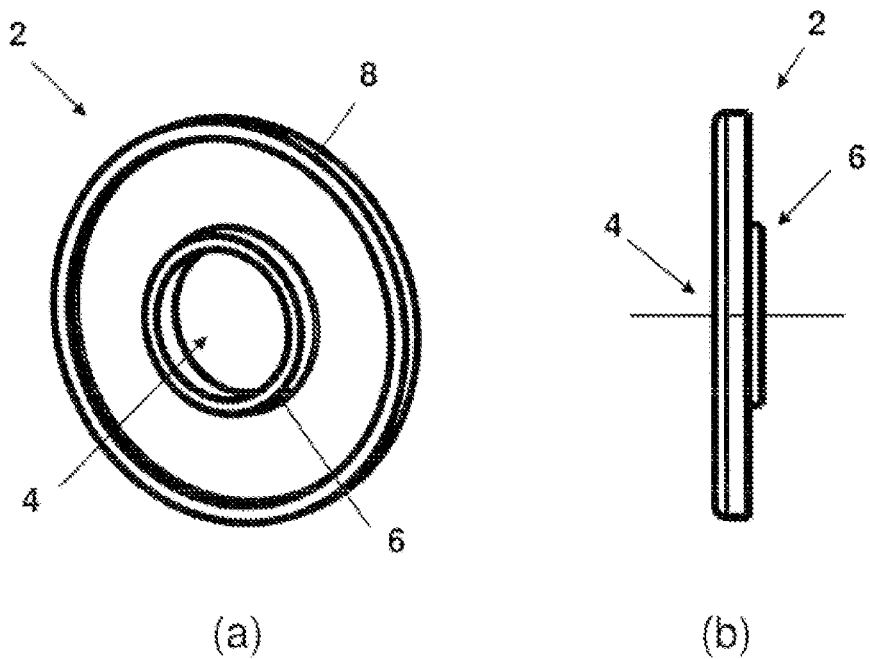
FIG. 1 shows a first attachment means and a second attachment means of an airbag according to a first embodiment of the invention, in each case in a perspective view and in a side view.

FIG. 1(a) shows a first attachment means 2 of an airbag according to a first embodiment of the invention in a perspective view. The first attachment means 2 is in the shape of a circular washer and it has, arranged in the center, a through-hole 4, and, peripherally around the through-hole 4 a raised part 6 or thickening 6, wherein the raised part forms a tube section around the through-hole 4. The first attachment means 2 can have peripherally on its outer margin a raised part 8 or thickening 8.

FIG. 1(b) shows the first attachment means 2 in a side view. The raised part 6 around the through-hole 4 is higher than the raised part 8 on the margin of the first attachment means 2. Here, the distance to the flat surface of the washer-shaped first attachment means 2 is understood to be the height. Both the raised part 6 and also the raised part 8 are arranged on only one side of the first attachment means 2.

FIG. 1(c) and FIG. 1(d) show a second attachment means 10 of the airbag according to the first embodiment in a perspective view and in a side view. The second attachment means 10 has a tubular area 12 and a head area 14, wherein the head area 14 can have a hexagonal shape. The second attachment means 10 is hollow inside. A bore 16 extends through the tubular area 12, wherein a threaded area 18 in the form of an inner thread 18 is formed on the inner wall of the bore 16. The bore 16 does not necessarily have to be drilled. The tubular area 12 is formed slightly conically on the outside, wherein the outer diameter of the tubular area 12 decreases in the direction away from the head area 14.

Figure 2:
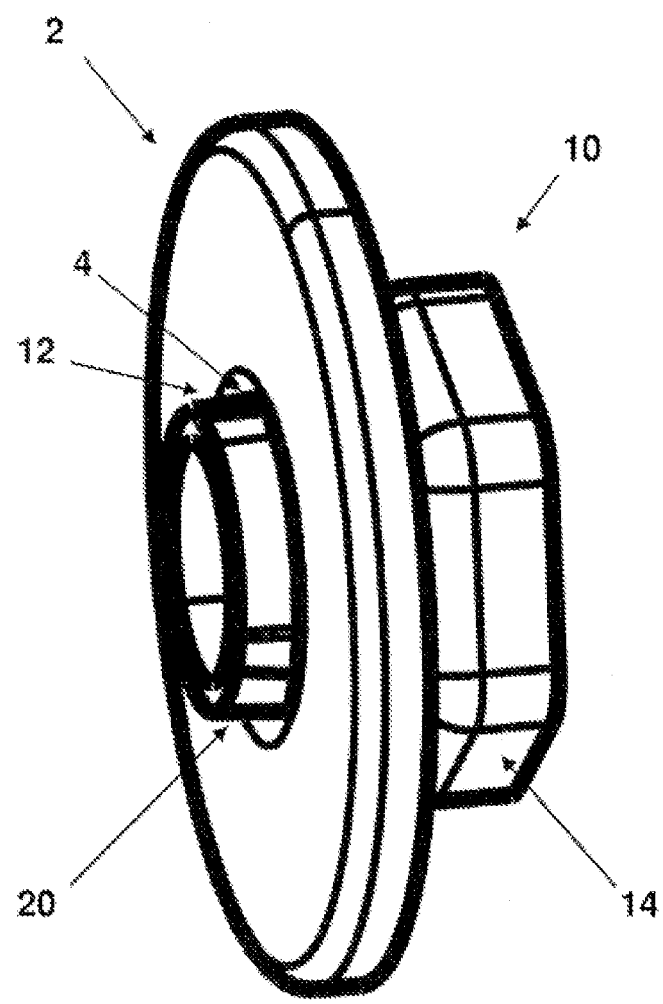
FIG. 2 shows the first and second attachment means of the airbag according to the first embodiment in the connected state in a perspective view.

FIG. 2 shows the first attachment means 2 and the second attachment means 10 of the airbag according to the first embodiment in the connected state in a perspective view. Here, the second attachment means 10 is inserted into the through-hole 4 of the first attachment means 2, until the surface of the head area 14 facing the first attachment means 2 comes in contact with the raised part 6 of the first attachment means 2. The raised part 6 here has a flange-like function. The outer surface of the tubular area 12 comes in contact with the inner surface of the through-hole 4 or the raised part 6, so that a press connection between the first attachment means 2 and the second attachment means 10 is produced. The area in which the press connection with the first attachment means 2 is can be referred to as coupling area of the second attachment means 10. A portion 20 of the tubular area 12 protrudes from the through-hole 4 after the connection has been made. This portion 20 which adjoins the coupling area fulfills the function of a spacing section 20 which prevents the distance between the head area 14 and a vehicle frame from falling below a predetermined distance when the second attachment means 10 is screwed to a vehicle-side threaded bolt.

Figure 3:
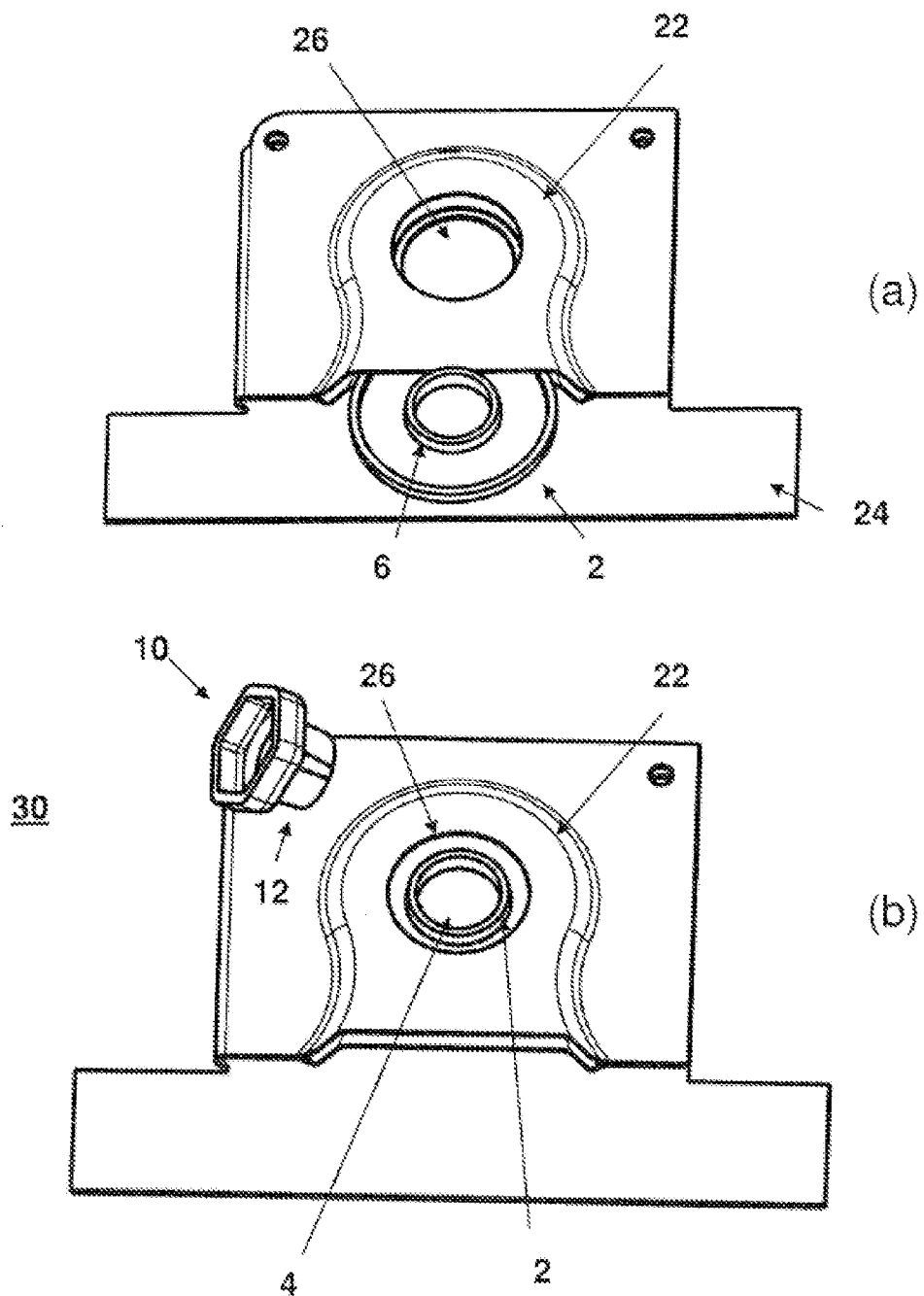
FIG. 3 shows, in a perspective view, how the first and second attachment means are introduced into an attachment pocket of the airbag according to the first embodiment.

As shown in FIG. 3(a), the first attachment means 2 is introduced from a lateral opening into the attachment pocket 22. The attachment pocket 22 is arranged on the marginal area of the airbag, in particular adjoining the inflatable airbag cushion 24. The airbag cushion 24 is represented in a simplified manner and it can be of any shape and size. The gas generator for the inflation of the airbag cushion 24 is not represented. The attachment pocket 22 can be formed by folding and sewing and/or adhesive bonding and/or 3D weaving of a flap on the marginal area of the airbag, wherein the flap can be formed so as to be continuous with the airbag cushion 24. In particular, the flap and the airbag cushion 24 can be produced from the same textile semifinished material. The reception area of the attachment pocket 22 has a keyhole contour which is formed by sewing or adhesive bonding of areas of the attachment pocket 22 or of the flap. The circular area of the keyhole contour corresponds substantially to the shape of the first attachment means 2. The constricted area of the keyhole contour prevents the first attachment means 2 from coming out of the attachment pocket 22. At the center in the circular area of the keyhole contour, a through-opening 26 is formed in the attachment pocket 22. The opening 26 is circular and it has a diameter which is greater than the outer diameter of the raised part 6 of the first attachment means 2.

FIG. 3(b) shows the first attachment means 2, as it is when introduced into the attachment pocket 22. As a result of the circular area of the keyhole contour, the first attachment means 2 is positioned in the attachment pocket 22 in such a manner that the through-hole 4 of the first attachment means 2 and the opening 26 of the attachment pocket 22 are arranged substantially concentrically. In this state, the tubular area 12 of the second attachment means 10 can be stuck into the through-hole 4 of the first attachment means 2, in order to make the airbag 30 available as a preassembled unit. However, it is also possible to first stick the vehicle-side threaded bolt through the through-hole 4, and then to screw the second attachment means 10 onto the vehicle-side threaded bolt.

Figure 4:
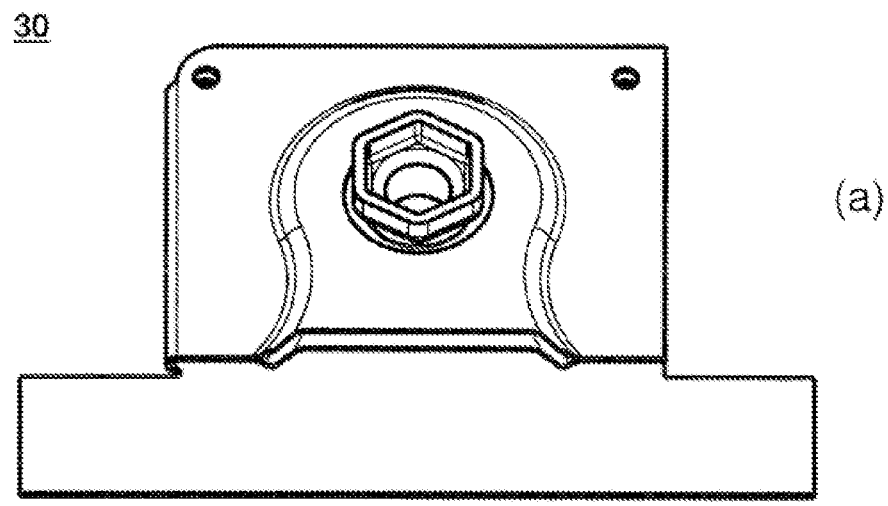
FIG. 4 shows the airbag according to the first embodiment in the preassembled, on one hand in a perspective view and on the other in a lateral cutaway view.
Figure 4:
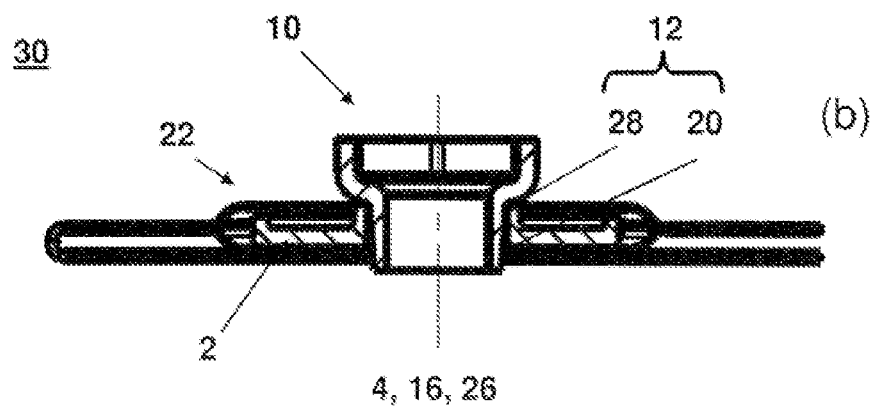

FIG. 4(a) and FIG. 4(b) show the airbag according to the first embodiment in the preassembled state. The through-hole 4 of the first attachment means 2, the bore 16 of the second attachment means 10, and the opening 26 of the attachment pocket 22 are arranged substantially concentrically. The outer lateral surface of the tubular portion 12 has a coupling area 28 which is in contact with the inner surface of the through-hole 4, and which ensures the press fit between first attachment means 2 and second attachment means 10, and a spacing section 20 which protrudes from the through-hole 4 and the opening 26.

Figure 5:
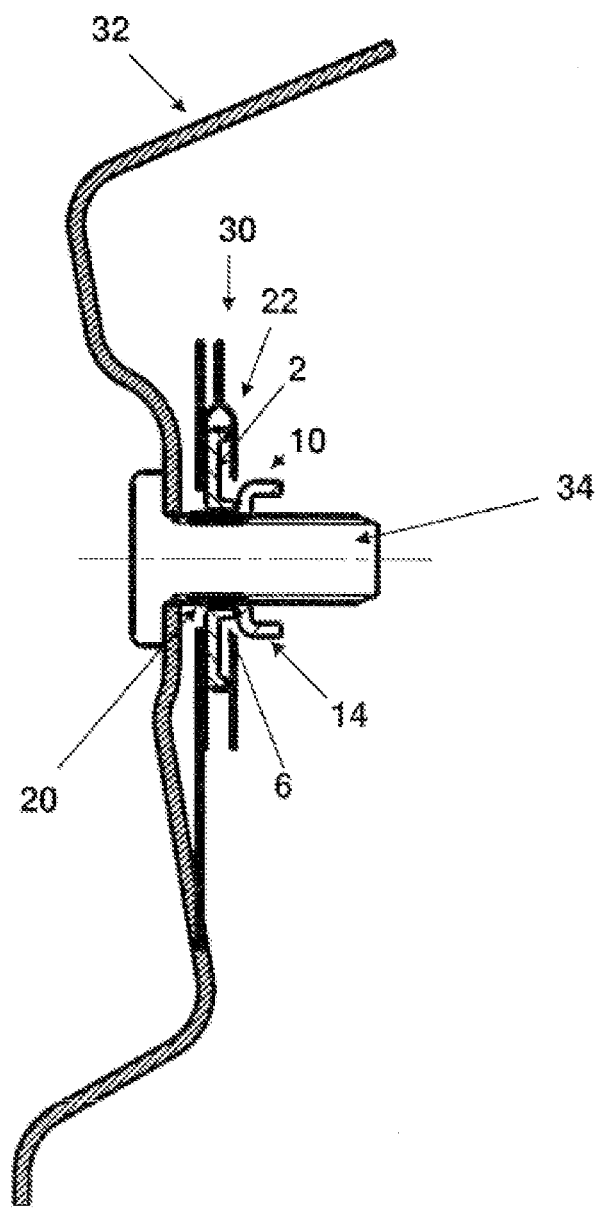
FIG. 5 shows the airbag according to the first embodiment in a state attached to a vehicle frame in a lateral cutaway view.

FIG. 5 shows the airbag 30 according to the first embodiment in a state attached to a vehicle frame 32, in a lateral cutaway view. On the vehicle frame, a vehicle-side threaded means 34 in the form of a threaded bolt 34 is arranged. The threaded bolt 34 is firmly screwed or welded to the vehicle frame 32. By means of the spacing section 20, it is ensured that no portion of the airbag 30 or of the attachment pocket 22 becomes clamped in between the first attachment means 2 and the vehicle frame 32. Furthermore, the raised part 6 contributes to preventing any portion of the attachment pocket 22 from becoming clamped in between the first attachment means 2 and the head area 14 of the second attachment means 10.

Figure 6:
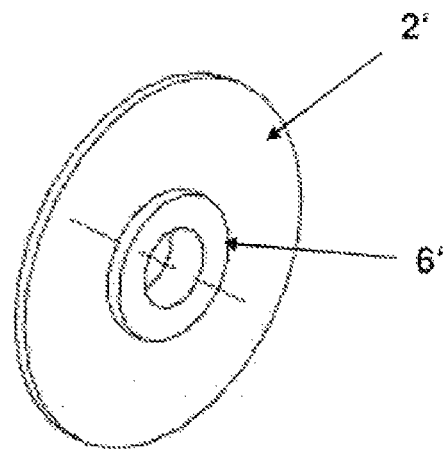
FIG. 6 shows a first attachment means of an airbag according to a second embodiment of the invention in a perspective view.

FIG. 6 shows a first attachment means 2' of an airbag according to a second embodiment of the invention in a perspective view. The first attachment means 2' has a raised part 6' on both sides, wherein the outer diameter of the raised part is dimensioned to be larger than in the first embodiment. This allows a greater application surface and thus a lower contact pressure during the attachment of the airbag to the vehicle frame by means of a second attachment means without spacing section.

Figure 7:
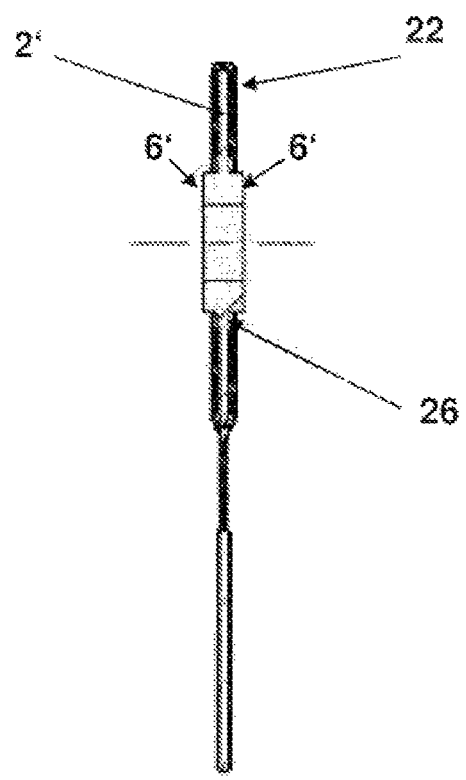
FIG. 7 shows, in a side view, the first attachment means of the airbag according to the second embodiment in a state introduced into the attachment pocket of the airbag.

FIG. 7 shows the first attachment means 2' in the attachment pocket 22 in a lateral cutaway view. The raised part 6' is arranged on both sides on the first attachment means 2' and it protrudes on both sides from the opening 26 of the attachment pocket 22. It is therefore possible to prevent a portion of the attachment pocket 22 from becoming clamped in between the first attachment means 2' and the vehicle frame or the head area of the second attachment means. In other words, even when the airbag is attached to the vehicle frame by means of a second attachment means without spacing section, that is to say the first attachment means 2' is clamped in between the head area of the second attachment means and the vehicle frame, the free rotatability of the attachment pocket 22 relative to the first attachment means 22 is still ensured.

Figure 8:
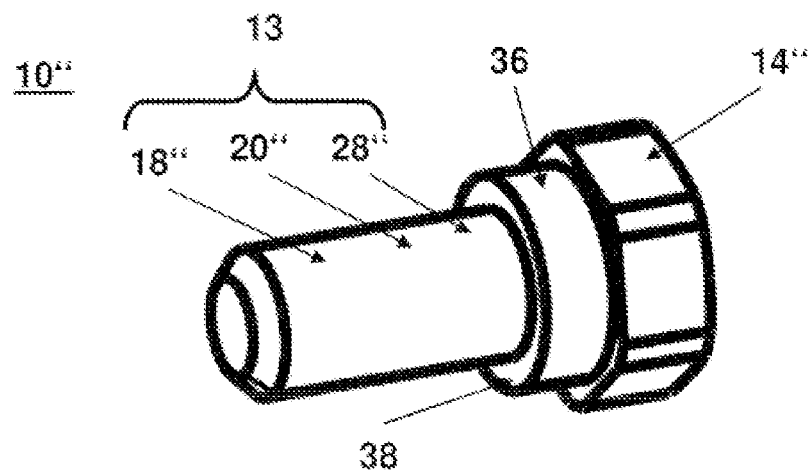
FIG. 8 shows a second attachment means of an airbag according to a third embodiment of the invention in a perspective view.

FIG. 8 shows a second attachment means 10" of an airbag according to a third embodiment of the invention in a perspective view. The second attachment means 2" has a bolt-shaped portion 13, a step section 36, and a head area 14". The bolt-shaped part 13 has a threaded area 18" in the form of a threaded bolt 18", and a coupling area 28", and it can have, in addition, a spacing section 20", wherein the threaded bolt 18" can be screwed to a vehicle-side threaded means in the form of a threaded bore. The coupling area 28", with or without spacing section 20" can also be referred to as shank. The step section 36 has a larger diameter than the bolt-shaped portion 13, but a smaller diameter than the head area 14". The front wall 38 or the outer edge thereof, at the time of connection to the first attachment means, comes in contact with the first attachment means. A step section can also be formed on the second attachment means 10 of the airbag 30 according to the first embodiment. The head area 14" is designed as a hex head.

Figure 9:
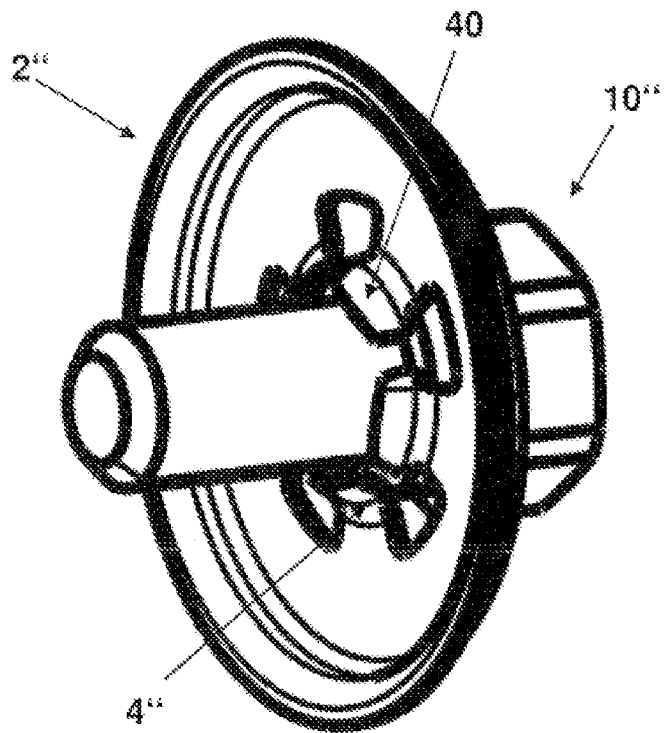
FIG. 9 shows, in a perspective view, a first attachment means and the second attachment means of the airbag according to the third embodiment in the connected state.

FIG. 9 shows a state in which the second attachment means 10" is connected to a first attachment means 2" of the third embodiment, by inserting the second attachment means 10" up to the point of stopping on the end wall 38 of the step section 36 into the through-hole 4" of the first attachment means 2". The first attachment means 2" is implemented as a spring washer with spring tabs 40. However, the second attachment means 2" can also be used in combination with the first attachment means 2 and 2' in accordance with the airbags of the first and second embodiments.

Figure 10:
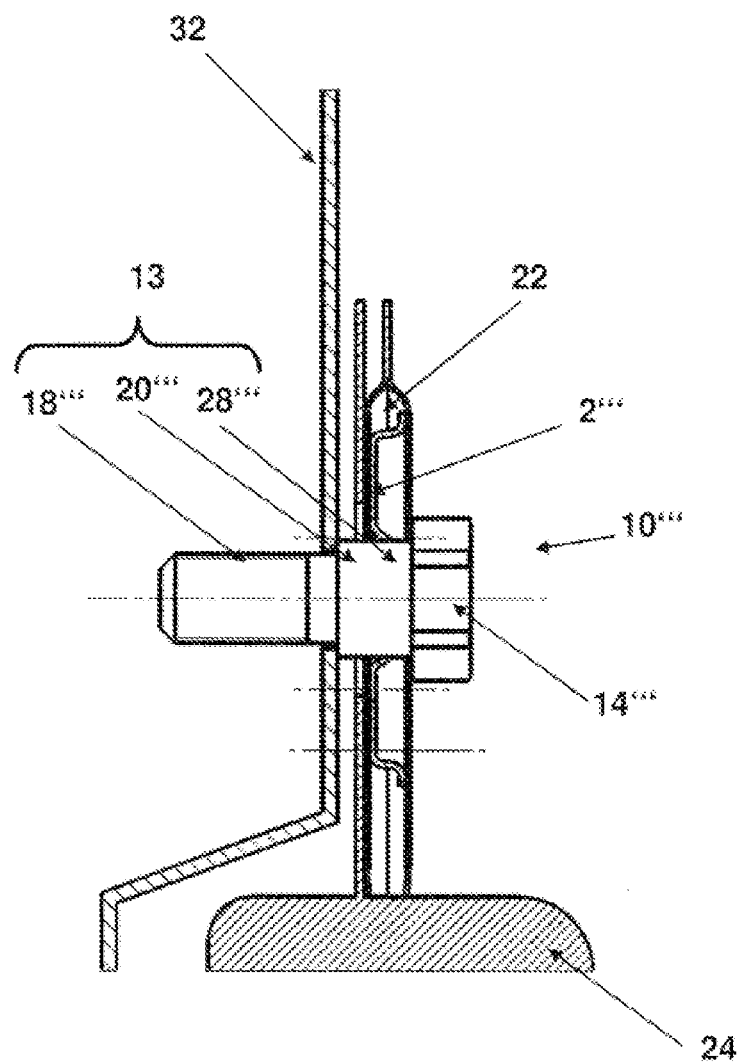
FIG. 10 shows an airbag according to a fourth embodiment in a state attached to a vehicle frame in a lateral cutaway view.

FIG. 10 shows an airbag 30''' according to a fourth embodiment in a state attached to a vehicle frame, in a lateral cutaway view. The second attachment means 14''' in the form of a bolt screw is attached on the vehicle structure 32, wherein the vehicle-side threaded means in the form of a threaded bore is not shown. In the fourth embodiment, two flaps extend from the marginal area of the airbag cushion 24, wherein, in one of the flaps, the attachment pocket 22 is formed. The second attachment means 10''' according to the fourth embodiment has a stepped area which can adjoin the head area 14''', and which can also be referred to as shank. This stepped area forms the coupling area 28''' and it forms the spacing section 20''' at least partially or includes it. The stepped area has a larger diameter than the threaded area 18'''. The stepped area prevents a portion of the attachment pocket as well as a portion of the second flap of the airbag from becoming clamped in between the first attachment means 2''' and the vehicle structure 32. Furthermore, the stepped area prevents the first attachment means 2''' from becoming firmly clamped between the head area 14''' of the second attachment means 10''' and the vehicle structure 32. Between the stepped area and the threaded area 18''', a threadless area can be provided, which can be considered to be part of the shank, and which, in addition, forms part of the spacing section 22'''. The threadless area can be implemented with a diameter larger than the diameter of the threaded area 18''' and thus ensure that the second attachment means 10''' can only be screwed to a certain depth into the vehicle-side threaded bore. In this manner, it is possible to ensure that a guide plate or the like of the vehicle structure 32 is not firmly clamped between the end surface of the stepped area of the second attachment means 10''' and the vehicle-side threaded means.

LIST OF REFERENCE NUMERALS 2, 2', 2", 2''' First attachment means
4, 4" Through-hole
6, 6' Raised part through-hole
8 Raised part margin
10, 10", 10''' Second attachment means
12 Tubular area
13 Bolt-shaped portion
14, 14", 14''' Head area
16 Bore
18, 18", 18''' Threaded area
20, 20", 20''' Spacing section
22 Attachment pocket
24 Airbag cushion
26 Through-opening
28, 28", 28''' Coupling area
30, 30''' Airbag
32 Vehicle frame
34 Vehicle-side threaded means
36 Step section
38 End wall
40 Spring tab

The invention claimed is:

1. An airbag for a vehicle, comprising:
   an attachment pocket with a through-opening, which extends through the layers of the attachment pocket,
   a first flat attachment means with a through-hole, wherein the first attachment means is arranged in the attachment pocket so that the through-hole is exposed on both sides of the attachment pocket through the opening,
   a second attachment means with a threaded area, a coupling area, and a head area,
   a spacing means, which is formed on the first attachment means wherein the spacing means comprises a thickened area which is formed around the through-hole of the first attachment means and protrudes from the opening of the attachment pocket,
   wherein
   the threaded area is designed to be connected to a corresponding vehicle-side threaded means,
   the second attachment means can be introduced into the through-hole of the first attachment means, so that the coupling area is in contact with an inner surface of the through-hole,
   the head area has a larger diameter than the through-hole and comprises a drive profile, and
   the spacing means is configured in order to prevent a jamming of a portion of the attachment pocket by the first attachment means at the time of the attachment of the airbag to the vehicle.

2. The airbag according to claim 1, wherein the spacing means comprises a step section, wherein the step section has a larger diameter than the through-hole of the first attachment means and a smaller diameter than the through opening of the attachment pocket.

3. The airbag according to claim 1, wherein the second attachment means has a tubular portion, wherein the threaded area is formed as inner thread in the tubular portion which can be connected to the vehicle-side thread, in particular in the form of a threaded bolt, and wherein the coupling area is formed by at least one section of an outer lateral surface of the tubular portion.

4. The airbag according to claim 1, wherein the second attachment means has a bolt-shaped portion, wherein the threaded area is formed as outer thread on the bolt-shaped portion, which can be connected to the vehicle-side threaded means, in particular in the form of a threaded hole, and wherein the coupling area is formed by at least a portion of a shank of the bolt-shaped portion between the threaded area and the head area.

5. The airbag according to claim 1, wherein the first attachment means is rotatably arranged in the attachment pocket.

6. The airbag according to claim 5, wherein the through-hole of the first attachment means and the coupling area of the second attachment means are configured in such a manner that the second attachment means can be connected in a clamping manner by means of a predeterminable clamping force to the first attachment means, wherein the predeterminable clamping force prevents the first and second attachment means from coming apart.

7. The airbag according to claim 6, wherein the predeterminable clamping force allows a relative twisting between the first and second attachment means.

8. The airbag according to claim 1, wherein the spacing means is configured in order to prevent jamming of the first attachment means between the second attachment means and a vehicle frame at the time of the screwing of the second attachment means to the vehicle-side threaded means.

9. An airbag for a vehicle, comprising:
an attachment pocket with a through-opening, which extends through the layers of the attachment pocket,
a first flat attachment means with a through-hole, wherein the first attachment means is arranged in the attachment pocket so that the through-hole is exposed on both sides of the attachment pocket through the opening,
a second attachment means with a threaded area, a coupling area, and a head area,
a spacing means, which is formed on the second attachment means wherein the spacing means comprises a spacing section which adjoins the coupling area of the second attachment means and is configured so as to prevent the distance between the head area and a vehicle frame from falling below a predetermined distance at the time of the screwing of the second attachment means to the vehicle-side threaded means,
wherein
the threaded area is designed to be connected to a corresponding vehicle-side threaded means,
the second attachment means can be introduced into the through-hole of the first attachment means, so that the coupling area is in contact with an inner surface of the through-hole,
the head area has a larger diameter than the through-hole and comprises a drive profile, and
the spacing means is configured in order to prevent a jamming of a portion of the attachment pocket by the first attachment means at the time of the attachment of the airbag to the vehicle.

10. The airbag according to claim 9, wherein the spacing means comprises a spacing section which adjoins the coupling area of the second attachment means and is configured so as to prevent the distance between the head area and a vehicle frame from falling below a predetermined distance at the time of the screwing of the second attachment means to the vehicle-side threaded means.

11. The airbag according to claim 10, wherein the second attachment means has a tubular portion, wherein the threaded area is formed as inner thread in the tubular portion which can be connected to the vehicle-side thread, in particular in the form of a threaded bolt, and wherein the coupling area is formed by at least one section of an outer lateral surface of the tubular portion.

12. The airbag according to claim 9, wherein the second attachment means has a tubular portion, wherein the threaded area is formed as inner thread in the tubular portion which can be connected to the vehicle-side thread, in particular in the form of a threaded bolt, and wherein the coupling area is formed by at least one section of an outer lateral surface of the tubular portion.

13. The airbag according to claim 9, wherein the spacing means is configured in order to prevent jamming of the first attachment means between the second attachment means and a vehicle frame at the time of the screwing of the second attachment means to the vehicle-side threaded means.

* * * * *